Nov. 23, 1937.　　C. R. DUNCAN　　2,099,728
BRAKE LEVER
Filed Dec. 13, 1935
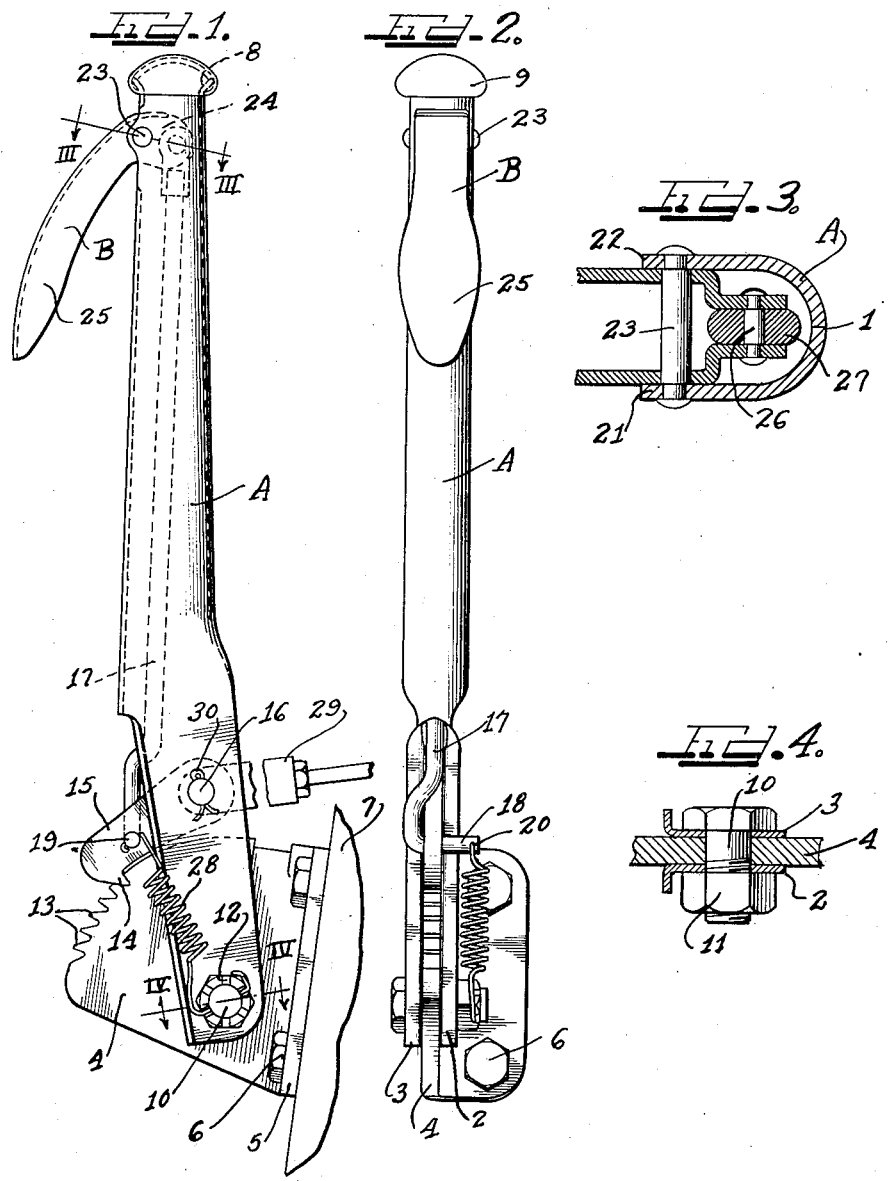
Inventor
Charles Robert Duncan.

Patented Nov. 23, 1937

2,099,728

UNITED STATES PATENT OFFICE 2,099,728

BRAKE LEVER

Charles Robert Duncan, Waukegan, Ill., assignor to Oakes Products Corporation, North Chicago, Ill., a corporation of Michigan Application December 13, 1935, Serial No. 54,173

3 Claims. (Cl. 74—537)

The present invention relates to a brake lever and more particularly to a brake lever assembly adapted to be mounted on the dash of an automotive vehicle.

Modern automobile design tends towards the elimination of brake levers in the middle of the driver's compartment so as to afford more leg room for comfort. Mounting a brake lever on the dash of an automotive vehicle is one desirable way of accomplishing this purpose.

Among the problems incidental to such mounting, may be mentioned the restriction of space available for the operation of a brake lever when so mounted; mounting of the lever in such manner as to be adequate for applying requisite braking action on the wheels and at the same time interfering as little as possible with the observation of the accessories usually mounted on the vehicle dash, at the same time not projecting from the dash to an extent as to interfere with persons entering and leaving the front seat of the vehicle. The brake lever of the present invention eliminates the thumb button which, for sometime, has been utilized for manipulating the brake pawl as experience has demonstrated that the thumb button type is hard to manipulate, especially by feminine drivers, as women do not possess sufficient strength in their hands to pull back the brake lever and at the same time operate the thumb button to disengage the pawl from the rachet to release the brakes.

The brake lever of the present invention contemplates one which is adapted to be mounted on the dash of an automotive vehicle with the lever extending downwardly from its mounting bracket, is short, and is provided with a handle for operating the pawl which handle is pivoted adjacent the free end of the lever to thereby reduce the lever length to a minimum without any reduction in its efficiency.

An object of the present invention is to provide brake lever assemblies for mounting on the dashes of automotive vehicles.

Another object of the present invention is to provide a brake lever construction wherein the over all length of the brake lever is reduced to a minimum without reduction of its efficiency.

A further object of the present invention is to provide a brake lever construction whereby the length of the lever may be reduced to a minimum without using the thumb button type of control for the brake lever pawl.

A still further object of the present invention is to provide in a brake lever construction a pawl held in engagement with a ratchet notch by spring means exerting pulling action on the pawl instead of pushing action against it as is common practice at the present time.

The accompanying drawing illustrates a lever constructed in accordance with the principles of the present invention and the views thereof are as follows:

Figure 1 is a side elevational view of a brake lever of the present invention, as mounted on the dash of an automotive vehicle, and shown in "off" position.

Fig. 2 is a front elevation of the lever of Fig. 1.

Fig. 3 is a transverse sectional view taken substantially in the plane indicated by line III—III of Fig. 1, and Fig. 4 is a fragmental sectional view taken substantially in the plane indicated by the line IV—IV of Fig. 1.

The drawing will now be explained.

The lever has been shown in the drawing as extending upwardly from its bracket. In practical application of the lever to a vehicle, the bracket is attached to a suitable support on the dashboard, behind the instrument board, with the lever hanging downwardly from the bracket.

The lever A is manufactured preferably from a flat blank of metal suitably shaped and stamped so that when it is fashioned into a substantially hollow form, the meeting edges are brought together making a tight seam as at 1. In the blanking of the piece and the formation of its as a hollow lever, two legs 2 and 3 are fashioned which are in parallel relation and laterally spaced to straddle the ratchet plate 4. The ratchet plate 4 is fashioned with an angularly disposed base 5 for receiving suitable bolts 6 to secure it to the face of a vehicle dash 7, or to a suitable bracket between the cowl and dash, with a lever extending downwardly. The lever is shown as mounted on the dash with the lever movable through a substantially vertical plane. If desired and space permitted, the lever might be mounted to swing in other than a vertical plane.

The lever for the most part is hollow and terminates at its free end with an outward flare 8 which serves to retain an end cap 9 on the free end of the lever which cap is applied to the free end of the lever and which has its margin spun over the outward flare to thus secure the cap firmly in position on the lever. The cap, therefore, closes the free end of the lever and at the same time affords an easy and convenient grip for manipulating the lever in use.

The ends of the legs 2 and 3 are provided with registering apertures to receive a pivot bolt 10 thereby connecting the lever to the plate 4 in pivotal relation, to receive a nut 11 for securing the lever and plate in assembled relation. Preferably the nut 11 is castellated having a plurality of notches 12 in it.

The margin of the plate 4, which is the lower margin when the lever construction is mounted for use, is provided with teeth 13 forming notches for engagement by the point 14 of a pawl 15 which is pivoted at 16 to the lever A by a point between the extremities of the lever and nearer the extremities of the legs.

For actuating the pawl, a pawl rod 17 extends within the interior of the lever A and has its end adjacent the pawl bent laterally and then transversely to provide a hooked end 18 for entering an aperture 19 in the pawl. The extremity of the hooked end 18 is apertured at 20 for a purpose to be later explained.

Adjacent the free end of the lever ears 21 and 22 are provided, being struck from the material of which the lever is made. These ears are apertured to receive a pivot pin 23. An operating handle for the pawl rod 17 is pivoted on the pin 23, and connected to operate as a lever of the first class.

The operating handle B is made preferably from flat metal suitably shaped and formed to provide strength and rigidity and also fashioned to form two legs 24 and 25, with the leg 24 being shorter. The extremities of the leg 24 are apertured to receive a pivot pin 26 for pivotally receiving a threaded socket member 27 into the threaded end of which the adjacent end of the pawl rod 17 is threaded. In this fashion, the pawl rod 17 is operatively connected to the operating handle B. The leg 25 of the operating handle B lies along the exterior of the lever, adjacent its free end and extends from its pivot 23 in a direction towards the fulcrum end of the lever, that is, towards the fulcrum bolt 10. By means of this construction, the length of the lever may be reduced to a minimum without sacrificing any of its efficiency in applying the requisite amount of power to the brakes of the vehicle. By fashioning the handle B so that the longer leg 25 lies along the lever, it is unnecessary to extend the length of the lever a distance substantially commensurate with that of the length of the longer leg of the handle B. In this way, the length of the lever is reduced and thus may be manipulated within a restricted space.

In order to maintain the pawl 15 in engagement with a notch of the plate 4 a tension spring 28 has one end engaged through the opening 20 in the extremity of the pawl rod 17 and its other end passed through two of the slots of the castellated nut 11 and through an opening or hole in the bolt, thus preventing the nut 11 from loosening on the bolt, and at the same time securing this end of the spring in place. The spring 28 acts, therefore, with a pulling pressure on the pawl as opposed to the present type of spring action which exerts a pushing action against the pawl to maintain it in engagement with a notch of its sector or ratchet.

A pull member, such as a cable or rod 29 is suitably attached to the pawl pivot 16 for applying the brakes when the lever A is swung to the left, as viewed in Fig. 1.

The lever construction of the present invention is one which affords a buttonless type of lever and which is provided with pawl manipulating means which may be pressed by the palm of the hand of an operator whereby the lever may be unlatched by a hand grip as opposed to a thumb applied pressure, and therefore more easily operated.

In operating the brakes of a vehicle equipped with the brake lever of the present invention, to apply the brakes, the lever would be grasped by its cap 9 and pulled to the left as viewed in Fig. 1 until the point of desired brake application had been reached. The pawl 15 would then engage a notch of the ratchet and the lever would be latched in "on" position. The provision of the extension spring 28 assures positive engagement of the pawl with its companion ratchet.

When it is desired to release the brakes, the operator would grasp the lever with his palm against the leg 25 of the handle B and his fingers about the rear of the lever and by squeezing action at the same time moving the lever to the left a sufficient distance to readily disengage the pawl from its then engaged notch, whereupon the lever may be returned to "off" position, which is that shown in Fig. 1.

The pivot pins 23 and 26 are shown as rivets having reduced ends with the extremities headed. The pivot pin 16 for connecting the pawl to the lever may be of any suitable kind but could be a cylindrical pin with cotters 30 at each end to secure it in position. Preferably the pin 16 is removably secured in the lever so that in the event the pull rod or pull cable 29 has to be repaired or replaced or any portion of the operating structure of the lever serviced, removal of the pin 16 will be possible whereby the other parts of the lever may be readily reached for proper maintenance.

The shorter leg 24 of the handle B is herein sometimes referred to as the load arm of the lever and the longer leg 25 referred to as the power arm, with the pivotal point of the handle referred to as the fulcrum.

The invention has been described herein more or less precisely as to details, yet it is to be understood that the invention is not to be limited thereby as changes may be made in the arrangement and proportion of parts and equivalents may be substituted without departing from the spirit and scope of the invention.

The invention is claimed as follows:

1. In a brake lever assembly, a bracket, a lever pivoted to said bracket, a lever pivot bolt connecting said lever to said bracket, a nut on said bolt, a pawl pivoted to said lever, a pawl spring having one end connected to said pawl and the other end passing through an opening in said bolt and engaging said nut with hook action to prevent loosening of the nut on the bolt and for securing said end of said spring in place.

2. A brake lever assembly including a notched sector and a lever pivoted to said sector, a pawl carried by said lever for coacting with said sector, a pivot bolt connected to said sector, a castellated nut on said bolt, and a pawl spring having one end hooked to said pawl and the other end passing through a slot of said nut and a cooperating aperture in said bolt to prevent said nut from shifting its position on said bolt.

3. Brake lever construction including a support for mounting on a vehicle dash, a lever comprising a stamping forming hollow shank and handle portions, said support and lever having cooperating means to latch the lever in adjusted position, a rod having a part working within said hollow shank and handle portions for unlatching said latching means, a squeeze-grip actuating member substantially right angular in side elevation having legs of unequal length, said member being pivoted at the angle between the legs to said lever closely adjacent the free end of the lever and with its longer leg of substantially U-shape in cross section extending along said lever in a direction away from the free end of the lever, said longer leg being spaced from the handle portion of the lever, and the shorter leg of said member entering and concealed by the hollow handle portion of the lever adjacent the free end of the lever and connected to said rod within said hollow handle portion.

CHARLES ROBERT DUNCAN.